US012577904B2

(12) United States Patent (10) Patent No.: US 12,577,904 B2
Sobanski et al. (45) Date of Patent: Mar. 17, 2026

(54) OFFSET CORE WITH SIDE EJECTOR NACELLE NOZZLES

(71) Applicant: Raytheon Technologies Corporation, Farmington, CT (US)

(72) Inventors: Jon Erik Sobanski, Glastonbury, CT (US); Jesse M. Chandler, S. Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 406 days.

(21) Appl. No.: 18/309,023

(22) Filed: Apr. 28, 2023

(65) Prior Publication Data

US 2024/0360784 A1 Oct. 31, 2024

(51) Int. Cl.
*F02C 3/04* (2006.01)
*F02C 3/30* (2006.01)
(52) U.S. Cl.
CPC ............... *F02C 3/04* (2013.01); *F02C 3/305* (2013.01)
(58) Field of Classification Search
CPC .. F01K 23/06; F01K 23/10; F02C 1/06; F02C 1/08; F02C 3/30; F02C 3/305
See application file for complete search history.

(56) References Cited

U.S. PATENT DOCUMENTS 2,447,696 A    8/1948   Forsyth
5,896,740 A  * 4/1999   Shouman ............. F01K 21/042
                                           60/39.55

6,233,940 B1 * 5/2001   Uji ........................ F01K 23/106
                                           60/39.01
7,258,724 B2 * 8/2007   Harazim ............... F01K 21/042
                                           60/39.52
10,024,235 B2    7/2018   Suciu et al.
11,603,798 B1    3/2023   Terwilliger et al.
2020/0109667 A1 * 4/2020   Muldoon .................. F02C 7/04
2023/0150678 A1 * 5/2023   Klingels ................ B64D 33/04
                                           244/55

OTHER PUBLICATIONS

Extended European Search Report for European Application No. 24173188.4 mailed Sep. 25, 2024.

* cited by examiner

*Primary Examiner* — Thuyhang N Nguyen

(74) *Attorney, Agent, or Firm* — Carlson, Gaskey & Olds, P.C.

(57) ABSTRACT

A propulsion system for an aircraft includes a fan that is rotatable about a fan axis, a core engine that is configured for generating a gas flow utilized to generate shaft power for driving the fan, a nacelle that surrounds the core engine and the fan, a condenser where water in the gas flow is condensed into a liquid form, an exhaust duct assembly where the gas flow exhausted from the core engine is directed to the condenser, an ejector duct where a portion of a bypass airflow is thermally communicated with the condenser to cool the gas flow, and an evaporator assembly that is in thermal communication with the exhaust duct where water recovered by the condenser is heated to generate a steam flow that is subsequently communicated to the core engine.

14 Claims, 6 Drawing Sheets

OFFSET CORE WITH SIDE EJECTOR NACELLE NOZZLES

STATEMENT REGARDING FEDERALLY SPONSORED RESEARCH OR DEVELOPMENT

This invention was made with Government support under Contract No.: DE-AR0001561 awarded by the United States Department of Energy, Office of ARPA-E. The Government has certain rights in this invention.

TECHNICAL FIELD

The present disclosure relates generally to an aircraft propulsion system and, more particularly, to a turbine engine including an offset gas generating core engine and nacelle mounted heat exchangers.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate an exhaust gas flow. Some energy in the exhaust flow is recovered as it is expanded through a turbine section, however, much of the heat energy within the exhaust gas flow is lost. Some heat energy may be recaptured and used to generate a steam flow that is injected into the core flow. The steam flow increases engine efficiencies by increasing mass flow without additional work required by the compressor section. Efficient heat exchangers for capturing heat and generating steam have large flow facing areas and are large compared to the overall engine size.

SUMMARY

A propulsion system for an aircraft according to one example disclosed embodiment includes, among other possible things, a fan that is rotatable about a fan axis, a core engine that is configured for generating a gas flow utilized to generate shaft power for driving the fan, a nacelle that surrounds the core engine and the fan, a condenser where water in the gas flow is condensed into a liquid form, an exhaust duct assembly where the gas flow exhausted from the core engine is directed to the condenser, an ejector duct where a portion of a bypass airflow is thermally communicated with the condenser to cool the gas flow, and an evaporator assembly that is in thermal communication with the exhaust duct where water recovered by the condenser is heated to generate a steam flow that is subsequently communicated to the core engine.

In a further embodiment of the foregoing propulsion system, the core engine is disposed about a core engine axis that is offset relative to the fan axis.

In a further embodiment of any of the foregoing, the propulsion system includes a power turbine that is coupled to the fan through a driveshaft. The gas flow from the core engine is received and expanded through the power turbine to drive the drive shaft.

In a further embodiment of any of the foregoing propulsion systems, the condenser includes a first condenser portion and a second condenser portion that is separate from the first condenser portion.

In a further embodiment of any of the foregoing propulsion systems, a cross-section transverse to the fan axis through either or both of the first condenser portion and the second condenser portion defines a ring sector area.

In a further embodiment of any of the foregoing propulsion systems, a central angle of the ring sector area for either or both of the first condenser portion and the second condenser portion is between 60 degrees and 120 degrees.

In a further embodiment of any of the foregoing, the propulsion system further includes an exhaust case where gas flow from the power turbine is communicated to the exhaust duct assembly. The exhaust duct assembly extends radially outward from the exhaust case toward the nacelle.

In a further embodiment of any of the foregoing propulsion systems, the exhaust duct assembly includes a plurality of radial duct parts that extend radially outward from the exhaust case toward the nacelle.

In a further embodiment of any of the foregoing propulsion systems, the evaporator assembly is in thermal communication with at least a portion of the exhaust duct assembly between the exhaust case and the condenser.

In a further embodiment of any of the foregoing propulsion systems, the ejector duct includes an ejector exit opening separate from a fan flow duct opening and radially outward of the fan flow duct opening.

In a further embodiment of any of the foregoing propulsion systems, the ejector duct includes a flow area that increases from an area at an ejector inlet to an area at an outlet to the condenser.

In a further embodiment of any of the foregoing propulsion systems, the flow area of the ejector duct includes a ratio between a flow area at the outlet to the condenser relative to a flow area at the ejector inlet that is between 4 and 20.

In a further embodiment of any of the foregoing propulsion systems, a flow area of the ejector inlet is between 4% and 30% of a flow area through the fan.

A propulsion system for an aircraft according to another example disclosed embodiment includes, among other possible things, a fan that is rotatable about a fan axis, a core engine that is configured for generating a gas flow, the core engine is disposed about a core engine axis that is inclined relative to the fan axis, a power turbine where the gas flow from the core engine is expanded to generate shaft power that is utilized to drive the fan, a nacelle that surrounds the core engine and the fan, a fan flow duct that defines a bypass flow path around the core engine and the power turbine through the nacelle, a water recovery system that includes a condenser where water in the gas flow is condensed into a liquid and a water collector where the condensed water is separated from the gas flow, an exhaust duct assembly where the gas flow exhausted from the core engine is directed to the condenser, an ejector duct where a portion of a bypass airflow is thermally communicated with the condenser, and an evaporator assembly that is in thermal communication with the exhaust duct where water recovered from the water collector is heated to generate a steam flow that is communicated to the core engine.

In a further embodiment of the foregoing, the propulsion system includes an exhaust case where gas flow exhausted from the power turbine is communicated to the exhaust duct assembly, In a further embodiment of any of the foregoing propulsion systems, the exhaust duct assembly includes a plurality of radial duct parts that extend radially outward from the exhaust case toward the nacelle.

In a further embodiment of any of the foregoing propulsion systems, the condenser includes a first condenser portion and a second condenser portion and the plurality of radial duct parts are circumferentially spaced apart and divided to communicate gas flow to a corresponding one of the first condenser portion and the second condenser portion.

In a further embodiment of any of the foregoing propulsion systems, the ejector duct includes an exit opening that is radially outward of a fan flow duct opening, and each of the fan flow duct opening and the ejector exit opening are disposed within a common exit plan transverse to the fan axis.

A method of operating a gas turbine engine, the method, according to another example disclosed embodiment includes, among other possible things, generating a gas flow with a core engine that is disposed about a core engine axis that is inclined relative to a fan axis, generating shaft power to drive the fan with a power turbine that receives the gas flow from the core engine, bypassing an airflow that is generated by the fan around the core engine and the power turbine through a fan flow duct that is defined within a nacelle, directing the gas flow to a condenser through an exhaust duct assembly, cooling the gas flow in the condenser with a portion of the airflow generated by the fan and directed through an ejector duct that is in thermal communication with the condenser, generating a steam flow by heating water that is recovered by the condenser in an evaporator assembly that is in thermal communication with the gas flow, and injecting at least a portion of the generated steam flow into the core engine.

In a further embodiment of the foregoing, the condenser includes a first condenser portion and a second condenser portion that is disposed on opposite sides of the fan flow duct and the method further includes directing a first part of the airflow that is generated by the fan into thermal communication with the first condenser portion and the second condenser portion through the ejector duct that is separate from airflow through the fan flow duct.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
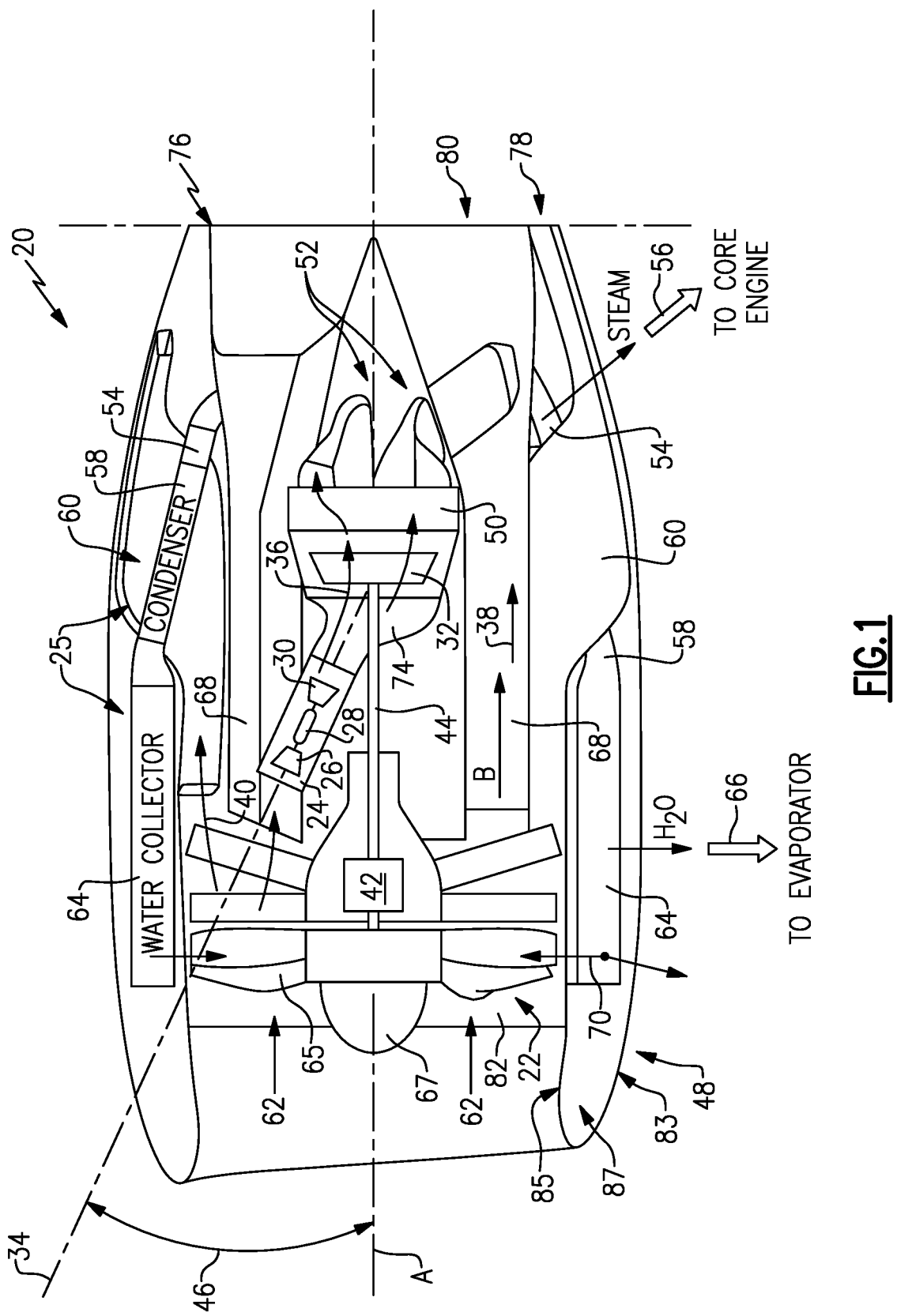
FIG. 1 is a cross-sectional view of an example aircraft propulsion system.
Figures 2, 3:
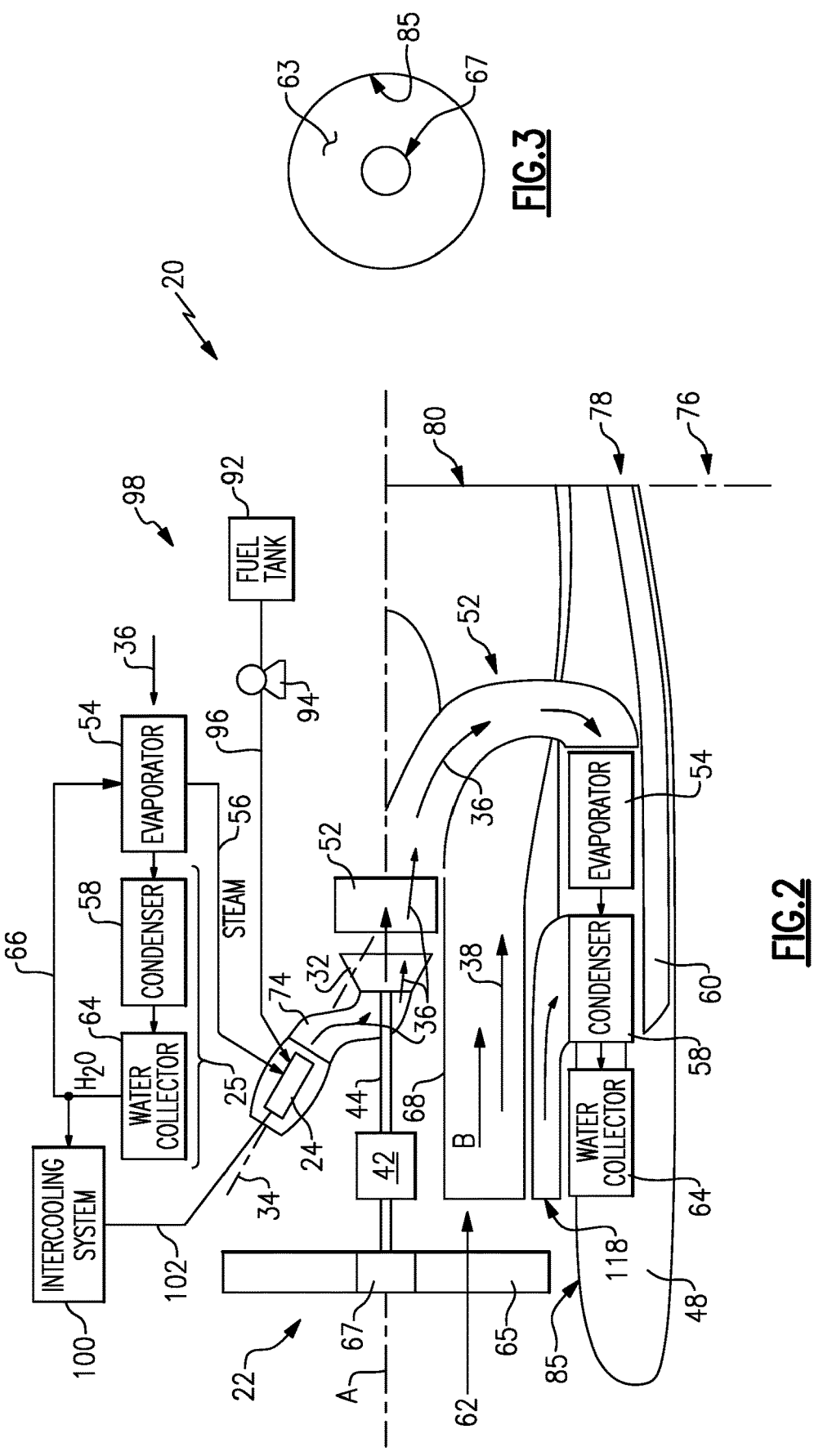
FIG. 2 is a schematic view of the example aircraft propulsion system.
FIG. 3 is a schematic view of an inlet area of the example aircraft propulsion system embodiment.

FIGS. 1 and 2 schematically illustrate an example steam injected and intercooled aircraft propulsion system that is generally indicated at 20. Heat exchangers utilized to recover water and generate steam operate most effectively with low pressure drops provided by large flow facing areas. The example propulsion system 20 incorporates heat exchangers for evaporator and condenser systems within a nacelle 48 to enable larger flow facing areas. Moreover, a gas generating core engine 24 is inclined relative to a fan axis A to free additional space within the nacelle 48 for ducting of gas flows and cooling flows to heat exchangers of a water recovery system 25 and an evaporator assembly 54.

The propulsion system 20 includes a gas generating core engine 24 supported along a core engine axis 34 that is offset at an angle 46 relative to a fan axis A. The example angle 46 is between around 25° and 45° however other angles could be utilized and are within the contemplation and scope of this disclosure. The relatively small size of the core engine 24 is enabled by the additional engine efficiency and power provided by steam injection. The small size of the core engine 24 enables the offset inclined orientation that provides additional space within the nacelle 48 for heat exchangers associated with water recovery and steam generation systems.

Although the example propulsion system 20 is shown and described by way of example as including a fan disposed within a nacelle 48, other engine architectures, such as for example an open rotor engine configuration is within the contemplation and scope of this disclosure.

Referring to FIG. 3, with continued reference to FIGS. 1 and 2, an inlet airflow 62 is communicated into the core engine 24 through the propulsive fan 22. The fan 22 includes a plurality of fan blades 65 supported on a center fan hub 67. In one disclosed example, the fan 22 is disposed at least partially within the nacelle 48. Accordingly, the inlet airflow 62 is communicated through an annular area 63 between the fan hub 67 and an inner surface 85 of the nacelle 48. The core engine 24 includes a compressor section 26 that communicates compressed inlet airflow 62 to a combustor section 28 where it is mixed with fuel and ignited to generate a core gas flow 36. The gas flow 36 generated by the core engine 24 expands through a turbine section 30 to produce shaft power to drive the compressor section 26.

The core engine 24 may be configured to burn hydrogen provided by a fuel system 98. (FIG. 2) The example fuel system 98 includes a liquid hydrogen (LH$_2$) tank 92 in communication with at least one pump 94. The pump 94 drives a fuel flow 96 to the core engine 24. Although hydrogen is shown and described by way of example, other non-carbon based fuels, biofuels or other sustainable aircraft fuels could also be utilized and are within the scope and contemplation of this disclosure. Additionally, traditional carbon-based fuels could also be utilized and are within the contemplation and scope of this disclosure.

A steam flow 56 is injected into the core engine 24 to provide an increased power output. The injected steam flow 56 provides increased power by increasing mass flow through the turbine section 30 without a corresponding increase in work from the compressor section 26. An example engine operation cycle may include up to (or more than) 35% steam-air-ratios (SAR) and may be assisted by a multiple fold (e.g., 2x, 3x, etc.) increase in moisture from burning H$_2$ as the fuel.

An intercooling system 100 (FIG. 2) provides an intercooling water flow 102 that is communicated to the core engine 24 to reduce a temperature of the core flows and increase mass flow. Water flow 102 injected into the compressor section 26 reduces temperatures of a core compressed inlet flow to provide an increased mass flow that decreases the work required by the compressor section 26.

The core gas flow 36 exhausted from the core engine 24 is routed through a transition duct 74 to a power turbine 32. The expansion of the gas flow 36 through the power turbine 32 drives the fan 22 through a driveshaft 44 and gearbox 42. Although an example core engine 24 and power turbine 32 are disclosed by way of example, other turbine engine architectures could be utilized and are within the scope and contemplation of this disclosure.

The gas flow 36 exhausted from the power turbine 32 is routed through a turbine exhaust case 50 into an exhaust duct assembly 52. The exhaust duct assembly 52 directs the gas flow 36 radially outward toward an evaporator assembly 54 and the water recovery system 25. The example water recovery system 25 includes a condenser 58 and a water collector 64. The gas flow 36 sequentially proceeds through the evaporator assembly 54, the condenser 58 and the water collector 64. From the water collector 64, gas flow 70 is exhausted into a fan flow duct 68 or into the ambient environment.

The example condenser 58 and evaporator 54 are heat exchangers that provide thermal communication between different flows. The condenser 58 provides for thermal communication between a cooling flow 40 and the gas flow 36 to cool the gas flow and condense water into a liquid form. The evaporator 54 provides thermal communication between the water flow 66 and the gas flow 36 to heat the water flow and generate steam subsequently injected into the core engine 24.

The example nacelle 48 includes a fan case 82 surrounding the fan 22 and defining a portion of the inner surface 85. An internal space 87 within the nacelle 48 is defined between an outer surface 83 and the inner surface 85 along a length of the nacelle 48. Portions of the condenser 58, the water collector 64, the evaporator assembly and an ejector duct 60 are disposed with the internal space 87. Mounting at the inner surface 85 and within the internal space 87 of the nacelle 48 provides large areas for location of the condenser 58 and evaporator 54.

A fan flow duct 68 extends from the fan 22 along the fan axis A to an exit plane 76. The fan flow duct 68 defines a bypass flow path B for a propulsive bypass flow 38. A portion of the inlet flow 62 is communicated to the core engine 24 and utilized for generation of the gas flow 36. The bypass flow 38 flows around the core engine 24 and the power turbine 32 and passes through a fan duct opening 80 disposed at the exit plane 76 of the nacelle 48.

A portion of the inlet flow 62 is communicated into an inlet 118 of the ejector duct 60 to provide the cooling flow 40 to the condenser 58. The cooling flow 40 through ejector duct 60 is placed in thermal communication with the gas flow 36 in the condenser 58. The cooling flow 40 is then exhausted through an ejector exit opening 78 disposed within the exit plane 76. In one example embodiment, the ejector exit opening 78 is disposed radially outward of the fan flow duct opening 80.

The area of the ejector inlet 118 is determined relative to the inlet area 63 through the fan 22 defined between the hub 67 and the inner surface 85 of the nacelle 48. In one example embodiment, the area of the ejector inlet 118 is between 4% and 30% of the inlet area 63 through the fan 22. In another example embodiment, the area of the ejector inlet 118 is between 10% and 20% of the inlet area 63. In another example embodiment, the area of the ejector inlet is between 15% and 20% of the inlet area 63.

Figure 4:
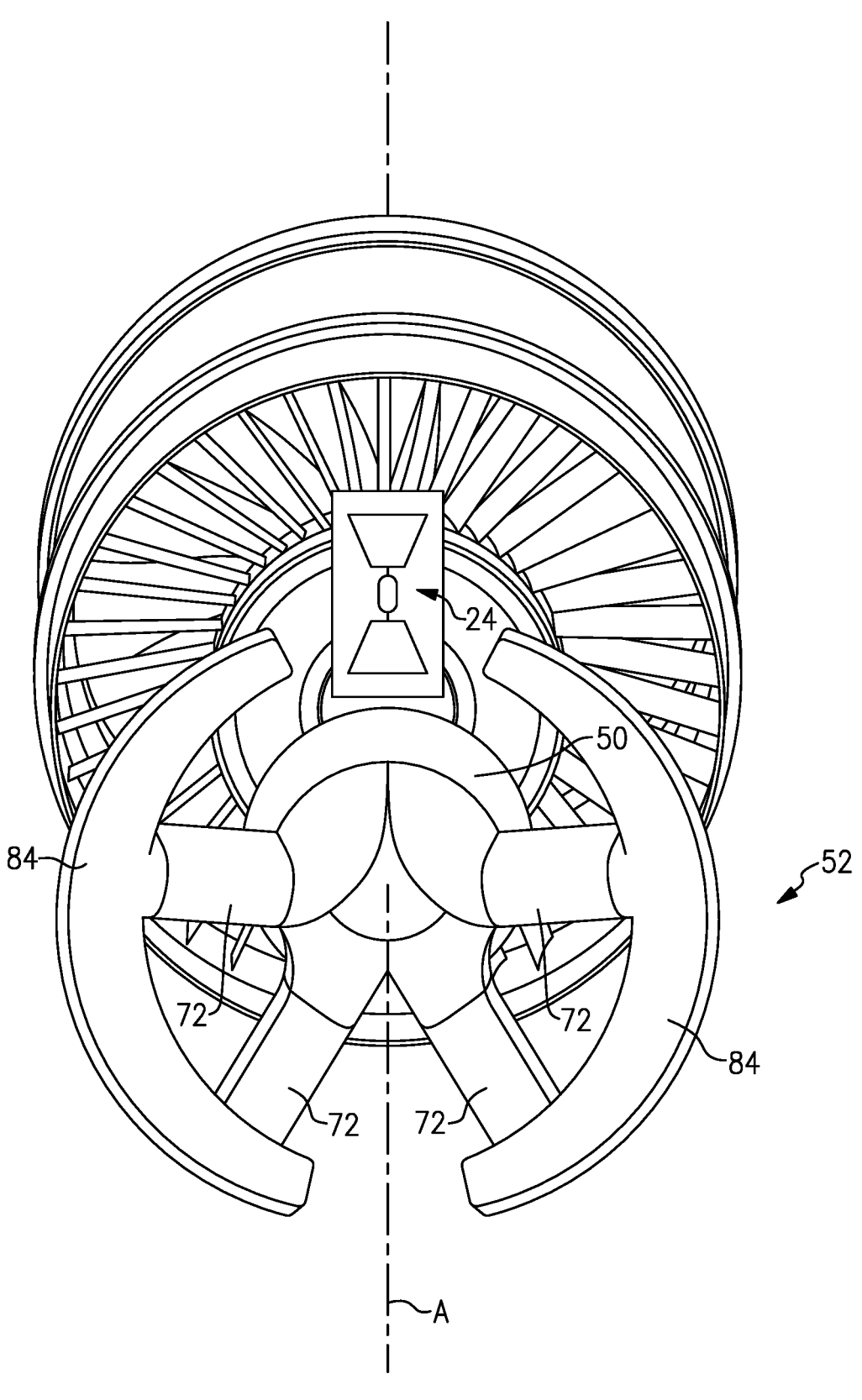
FIG. 4 is an aft view of the example exhaust duct assembly.
Figure 5:
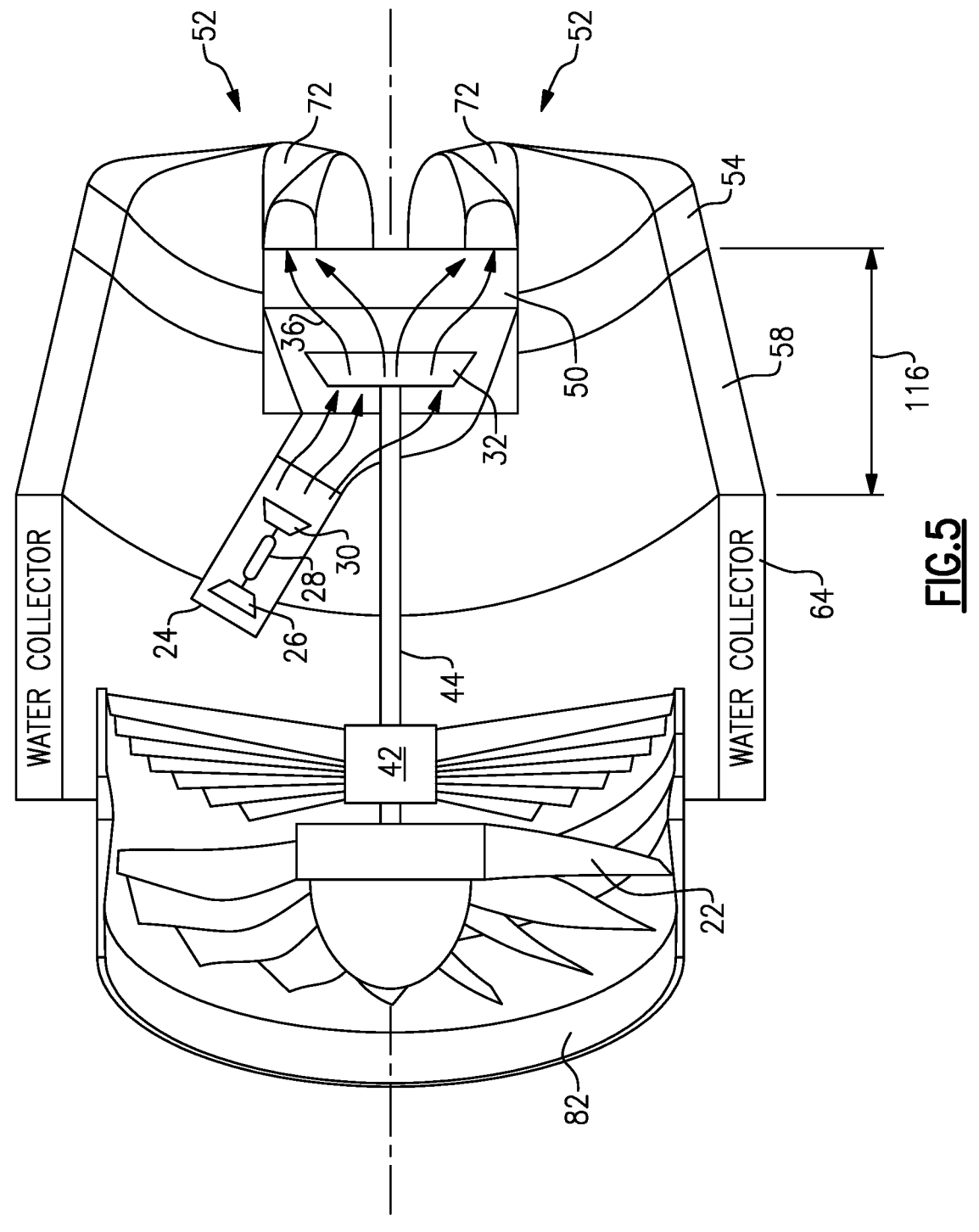
FIG. 5 is a sectional view of portions of an exhaust duct assembly and a water recovery system.

Referring to FIGS. 4 and 5 with continued reference to FIGS. 1 and 2, the exhaust duct assembly 52 includes a plurality of radial parts 72 that extend radially outward from the turbine exhaust case 50 toward the inner surface 85 of the nacelle 48. In one disclosed example, four radial parts 72 are provided that direct gas flow 36 toward accumulator portions 84. In one disclosed example, the four radial parts 72 are spaced apart circumferentially and communicate the gas flow 36 to accumulator portions 84. In one disclosed example, two accumulator portions 84 are disposed on opposite sides of the fan axis A and each are fed gas flow 36 by two of the four radial parts 72. The accumulator portions 84 communicate the gas flow 36 to the evaporator assembly 54 than to the condenser 58.

Figure 6:
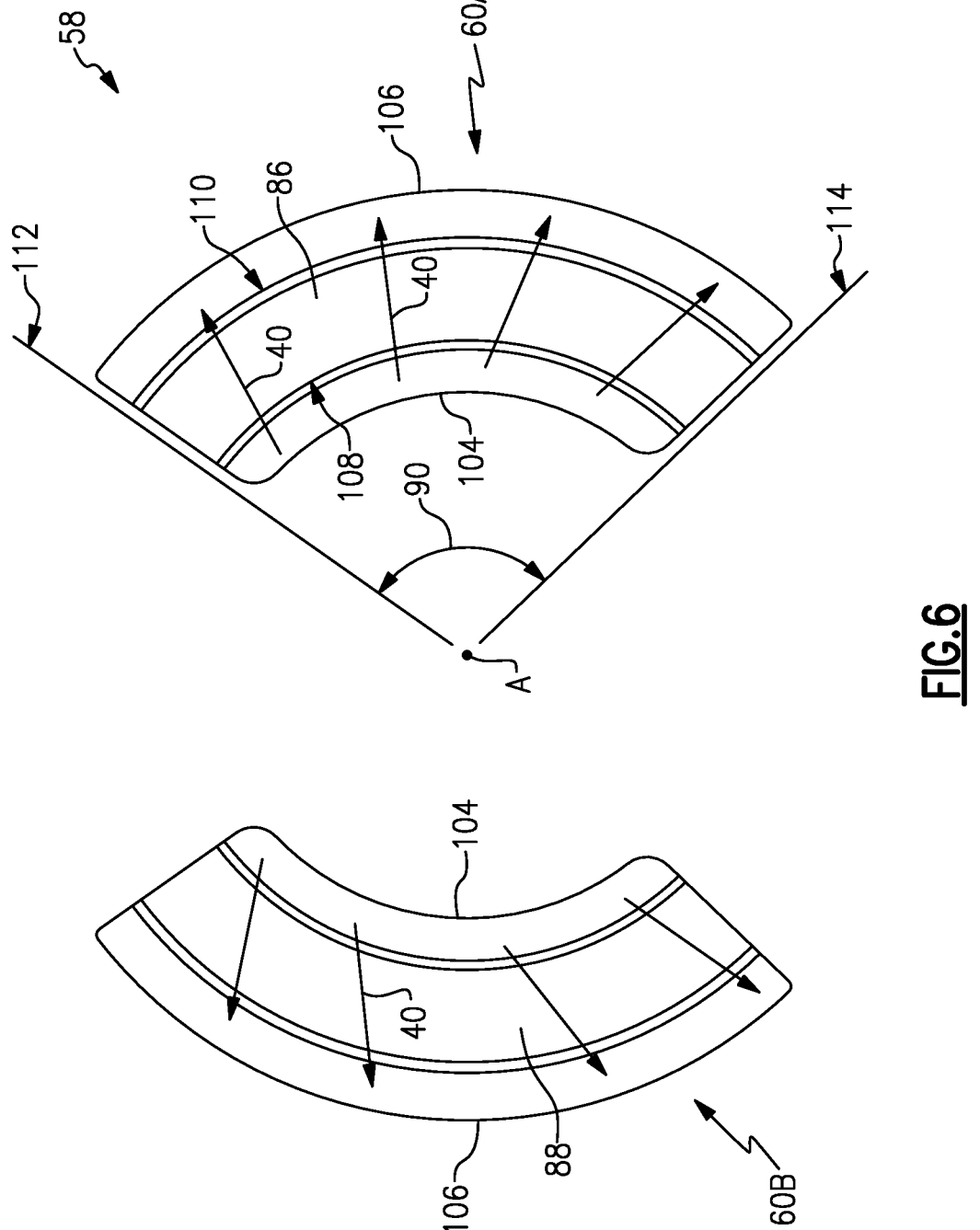
FIG. 6 is a schematic view of an example condenser embodiment through a section transverse to an engine fan axis.

Referring to FIG. 6 with continued reference to FIG. 5, the example condenser 58 comprises a first condenser portion 86 and a second condenser portion 88. FIG. 6 is a schematic view of a portion of the first and second condenser portions 86, 88 through a section transverse to the fan axis A.

The condenser portions 86, 88 are generally configured as ring sectors. A ring sector is a portion of a circle bounded by arcs of differing radii bounded by radial lines separated by a central angle 90. In one disclosed example, the condenser portions 86, 88 include an arc shaped inner surface 108 radially spaced apart from an arc shaped outer surface 110. The inner surface 108 and the outer surface 110 extend between radial lines 112 and 114 that are separated by the central angle 90. In one disclosed example, the central angle 90 is between 60 degrees and 120 degrees. In another example embodiment, the central angle 90 is between 70 degrees and 110 degrees. The example condenser portions 86, 88 are generally shaped as a sector of an annulus, but may be shaped in irregular shapes that correspond with structural features of the nacelle 48. The example disclosed shape provides a large flow facing area for the cooling flow 40 from the ejector duct 60.

In the example shown schematically in FIG. 6, a first ejector duct 60A is provided with the first condenser portion 86 and a second ejector duct 60B is provided with the second condenser portion 88. Each of the ejector ducts 60A, 60B include an inner portion 104 that feeds the cooling flow 40 to the condenser 58 and an outer portion 106 that receives cooling airflow exhausted from the condenser portions 86, 88. Accordingly, the cooling flow 40 flows radially outward from the inner portion 104, through the corresponding condenser portions 86, 88 to the outer portion 106. The inner surface 108 of each of the condenser portions 86, 88 provides an inlet face area for the cooling flow 40. The inlet flow area includes the surface 108 along an axial length 116 (FIG. 5) of the of the condenser portions 86, 88. The large face area provides for the advantageous application of cooling flow 40 to each of the condenser portions 86, 88 within the nacelle 48.

Figure 7:
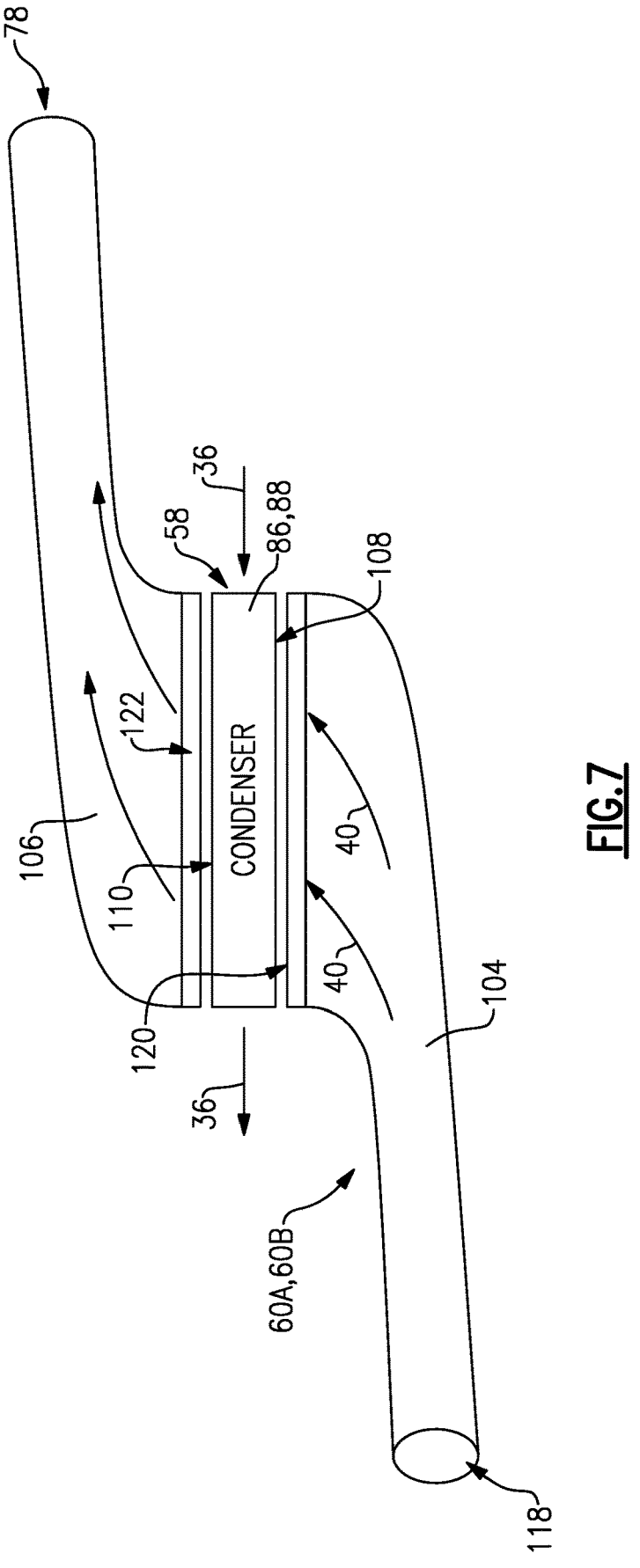
FIG. 7 is a schematic view of an example ejector duct and the condenser.

Referring to FIG. 7, with continued reference to FIGS. 5 and 6, the inner portion 104 of each of the ejector ducts 60A, 60B provide an increasing flow area between an inlet 118 for the cooling flow and an outlet 120 to the condenser 58. The increasing area provides beneficial cooling flow characteristics that improve thermal communication with the exhaust gas flow 36 through the condenser 58. The difference in flow areas between the inlet 118 and the outlet 120 at the condenser 58 can be described as a ratio between the area at the outlet 120 relative to the area at the inlet 118. In one example disclosed embodiment, a ratio of the area at the outlet 120 to the area at the inlet 118 is between 4 and 20. In another disclosed embodiment, a ratio of the area of the outlet 120 to the area of the inlet 118 is between 10 and 20. In another disclosed example embodiment, the ratio of the area of the outlet 120 to the area of the inlet 118 is between 12 and 18.

The annular configuration and shape of the condenser portions 86, 88 provide large flow facing areas at the inlet surface 108 for receiving the cooling flow 40. The large flow facing areas are enabled by locating the condenser portions 86, 88 in the nacelle 48. The outer portion 106 of the ejector ducts 60A, 60B, include an outlet 122 with a flow area larger than a flow area at the ejector exit opening 78.

Although an example engine configuration is described by way of example, it will be appreciated that other engine configurations may include additional structures and features and are within the contemplation and scope of this disclosure.

Accordingly, the example propulsion system embodiments include an evaporator and condenser with increased efficiencies by providing corresponding heat exchangers within the nacelle assembly such that larger surface areas can be realized for thermal transfer between cooling and heating flows. Moreover, the inclined mounting of the gas generating core engine provides additional space within the nacelle assembly for larger heat exchangers while maintaining compatibility with traditional engine mounting locations.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a fan rotatable about a fan axis;
a core engine configured for generating a gas flow utilized to generate shaft power for driving the fan;
a nacelle surrounding the core engine;
a condenser where water in the gas flow is condensed into a liquid form, wherein the condenser comprises a first condenser portion and a second condenser portion;
an exhaust duct assembly where the gas flow exhausted from the core engine is directed to the condenser, wherein the exhaust duct assembly comprises a plurality of radial duct parts that are circumferentially spaced apart and divided to communicate the gas flow to a corresponding one of the first condenser portion and the second condenser portion;
an ejector duct where a portion of a bypass airflow is thermally communicated with each of the first condenser portion and the second condenser portion to cool the gas flow; and
an evaporator assembly in thermal communication with the exhaust duct where water recovered by each of the first condenser portion and the second condenser portion is heated to generate a steam flow subsequently communicated to the core engine.

2. The propulsion system as recited in claim 1, wherein the core engine is disposed about a core engine axis that is offset relative to the fan axis.

3. The propulsion system as recited in claim 1, including a power turbine coupled to the fan through a driveshaft, wherein the gas flow from the core engine is received and expanded through the power turbine to drive the drive shaft.

4. The propulsion system as recited in claim 3, further comprising an exhaust case where gas flow from the power turbine is communicated to the exhaust duct assembly, wherein the exhaust duct assembly extends radially outward from the exhaust case toward the nacelle.

5. The propulsion system as recited in claim 4, wherein the evaporator assembly is in thermal communication with at least a portion of the exhaust duct assembly between the exhaust case and the condenser.

6. The propulsion system as recited in claim 1, wherein a cross-section transverse to the fan axis through either or both of the first condenser portion and the second condenser portion defines a ring sector area.

7. The propulsion system as recited in claim 6, wherein a central angle of the ring sector area for either or both of the first condenser portion and the second condenser portion is between 60 degrees and 120 degrees.

8. The propulsion system as recited in claim 1, wherein the ejector duct includes an ejector exit opening separate from a fan flow duct opening and radially outward of the fan flow duct opening.

9. The propulsion system as recited in claim 1, wherein the ejector duct comprises a flow area that increases from an area at an ejector inlet to an area at an outlet to the condenser.

10. The propulsion system as recited in claim 9, wherein the flow area of the ejector duct includes a ratio between a flow area at the outlet to the condenser relative to a flow area at the ejector inlet that is between 4 and 20.

11. The propulsion system as recited in claim 9, wherein a flow area of the ejector inlet is between 4% and 30% of a flow area through the fan.

12. A propulsion system for an aircraft comprising:
a fan rotatable about a fan axis;
a core engine configured for generating a gas flow, the core engine is disposed about a core engine axis that is inclined relative to the fan axis;
a power turbine where the gas flow from the core engine is expanded to generate shaft power utilized to drive the fan;
a nacelle surrounding the core engine and the fan;
a fan flow duct defining a bypass flow path around the core engine and the power turbine through the nacelle;
a water recovery system including a condenser where water in the gas flow is condensed into a liquid and a water collector where the condensed water is separated from the gas flow;
an exhaust duct assembly where the gas flow exhausted from the core engine is directed to the condenser, wherein the condenser a first condenser portion and a second condenser portion;
an exhaust case where gas flow exhausted from the power turbine is communicated to the exhaust duct assembly, wherein the exhaust duct assembly comprises a plurality of radial duct parts that extend radially outward from the exhaust case toward the nacelle and the plurality of radial duct parts are circumferentially spaced apart and divided to communicate gas flow to a corresponding one of the first condenser portion and the second condenser portion;
an ejector duct where a portion of a bypass airflow is thermally communicated with the condenser; and
an evaporator assembly in thermal communication with the exhaust duct where water recovered from the water collector is heated to generate a steam flow that is communicated to the core engine.

13. The propulsion system as recited in claim 12, wherein the ejector duct includes an exit opening that is radially outward of a fan flow duct opening, and each of the fan flow duct opening and the ejector exit opening are disposed within a common exit plan transverse to the fan axis.

14. A method of operating a gas turbine engine, the method comprising:

generating a gas flow with a core engine that is disposed about a core engine axis that is inclined relative to a fan axis;

generating shaft power to drive the fan with a power turbine receiving the gas flow from the core engine;

bypassing an airflow generated by the fan around the core engine and the power turbine through a fan flow duct defined within a nacelle;

directing the gas flow to a condenser through an exhaust duct assembly;

cooling the gas flow in the condenser with a portion of the airflow generated by the fan and directed through an ejector duct in thermal communication with the condenser, wherein the condenser comprises a first condenser portion and a second condenser portion disposed on opposite sides of the fan flow duct;

directing a first part of the airflow generated by the fan into thermal communication with the first condenser portion and the second condenser portion through the ejector duct separate from airflow through the fan flow duct;

generating a steam flow by heating water recovered by the condenser in an evaporator assembly in thermal communication with the gas flow; and injecting at least a portion of the generated steam flow into the core engine.

* * * * *